US011826930B2

(12) United States Patent
Lenz

(10) Patent No.: US 11,826,930 B2
(45) Date of Patent: Nov. 28, 2023

(54) METHOD AND DEVICE FOR APPLYING A SEALING COMPOUND TO THE BASE AND THE INSIDE OF AN ANNULAR WALL OF A LID FOR CONTAINERS

(71) Applicant: Saeta GmbH & Co. KG, Wedel (DE)

(72) Inventor: Carsten Lenz, Uetersen (DE)

(73) Assignee: Saeta GmbH & Co. KG, Wedel (DE)

(*) Notice: Subject to any disclaimer, the term of this patent is extended or adjusted under 35 U.S.C. 154(b) by 846 days.

(21) Appl. No.: 16/640,818

(22) PCT Filed: Aug. 20, 2018

(86) PCT No.: PCT/EP2018/072451
§ 371 (c)(1),
(2) Date: Feb. 21, 2020

(87) PCT Pub. No.: WO2019/038237
PCT Pub. Date: Feb. 28, 2019

(65) Prior Publication Data
US 2020/0376724 A1 Dec. 3, 2020

(30) Foreign Application Priority Data
Aug. 21, 2017 (DE) ...................... 10 2017 119 032.5

(51) Int. Cl.
*B29C 43/18* (2006.01)
*B29C 31/04* (2006.01)
(Continued)

(52) U.S. Cl.
CPC ............ *B29C 43/18* (2013.01); *B29C 31/048* (2013.01); *B29C 43/34* (2013.01); *B29C 2043/3433* (2013.01); *B29L 2031/565* (2013.01)

(58) Field of Classification Search
None
See application file for complete search history.

(56) References Cited

U.S. PATENT DOCUMENTS

2016/0129613 A1* 5/2016 Neben ............... B29C 43/021
156/196

FOREIGN PATENT DOCUMENTS

DE 102009040802 A1 3/2011
DE 102013008045 A1 11/2014
(Continued)

OTHER PUBLICATIONS

Haar WO2011023399A1 English Translation 2011 (Year: 2011).*
(Continued)

*Primary Examiner* — Jacob T Minskey
*Assistant Examiner* — Adrien J Bernard
(74) *Attorney, Agent, or Firm* — Barclay Damon LLP

(57) ABSTRACT

A method for applying a sealing compound to a lid base and an inside of an annular wall of a lid comprises applying a first annular structure to the lid base with an applicator. The first annular structure comprises the sealing compound. The first annular structure of sealing compound is pressed against the lid base to form a second annular structure. The pressing is performed using an annular first press ram surrounding an inner forming part. The second annular structure of sealing compound is pressed into a transition area with an end face of the first press ram. The sealing compound is pressed through a gap defined between the end face of the first press ram and the lid base. The second annular structure is pressed flat against the lid base and into the gap between the lid wall and the first press ram using a second press ram.

17 Claims, 3 Drawing Sheets

(51) Int. Cl.
   *B29C 43/34* (2006.01)
   *B29L 31/56* (2006.01)

(56) References Cited

FOREIGN PATENT DOCUMENTS

| EP | 0219265 A2 | 8/1985 |
| EP | 3162729 A1 | 3/2017 |
| WO | 2011/023399 A1 | 3/2011 |
| WO | 2015/181669 A2 | 12/2015 |

OTHER PUBLICATIONS

PCT/EP2018/072451; International Filing Date Aug. 20, 2018; English Translation of International Preliminary Report on Patentability; dated Mar. 5, 2020 (12 pages).

\* cited by examiner

Fig. 4
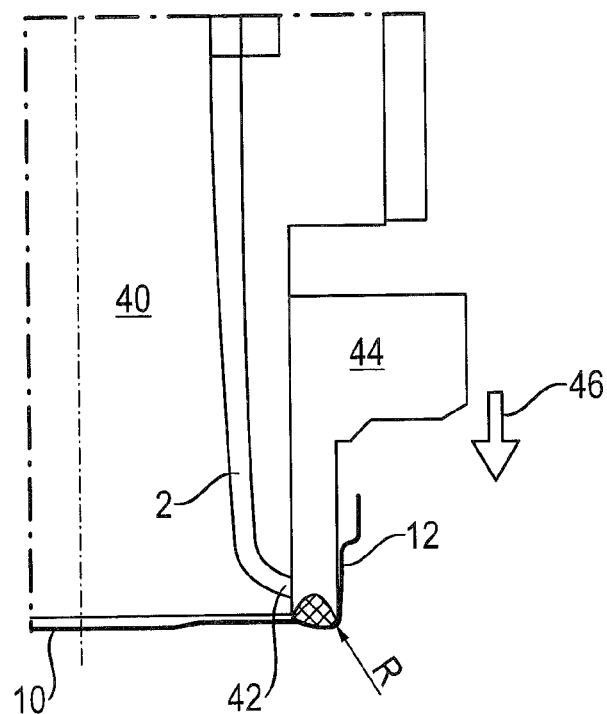
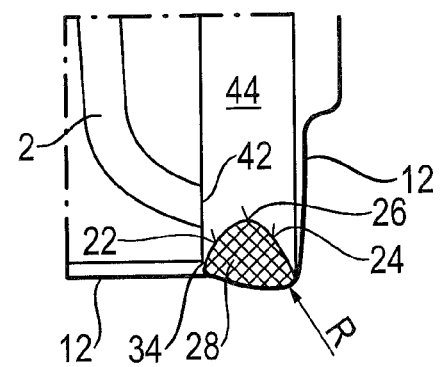
Fig. 5

METHOD AND DEVICE FOR APPLYING A SEALING COMPOUND TO THE BASE AND THE INSIDE OF AN ANNULAR WALL OF A LID FOR CONTAINERS

CROSS REFERENCE TO RELATED INVENTION

This application is a national stage application pursuant to 35 U.S.C. § 371 of International Application No. PCT/EP2018/072451, filed on Aug. 20, 2018, which claims priority to, and benefit of, German Patent Application No. 10 2017 119 032.5, filed Aug. 21, 2017, the entire contents of which are hereby incorporated by reference.

BACKGROUND

The invention relates to a method for applying a sealing compound to the base and the inside of an annular wall of a lid for containers.

From DE 10 2009 040 802 B4 a method and a device for applying a sealing compound to the base of a lid for containers has become known, in which plasticized sealing compound is introduced in annular form into a tempered annular gap with variable gap width. By reducing the gap width to zero, the sealing compound is completely pressed out of the annular gap and formed into an annular structure. The annular structure is then deposited on the lid base, the gap width being reduced at such a high speed and the sealing compound being expressed at such a high speed that adhesion of the melt to gap edges and surfaces adjacent to the annular gap is prevented. The device employed for this purpose is generally referred to as an applicator.

From WO 2015/181668 A1 an applicator has become known in which sealing compound is pressed out via channels and an annular gap of an inner forming part. The inner forming part is guided against the base of a lid, whereby a gap can be left free. The inner forming part is surrounded by an annular outer forming part which is movable coaxially with the inner forming part and acts like a knife, whereby the sealing compound emerging from the annular gap is separated. The sealing compound is then pressed by the end face of the outer forming part against the lid base and partially against the lid wall.

During the subsequent molding of the sealing compound with a press ram, there is a risk that the sealing compound will not fill the transition area between the lid base and the lid wall and that air will be trapped. This is aggravated by the fact that the transition area from the lid wall to the lid base, which has a small radius, is somewhat lower than the lid base.

The coating of a container lid with a sealing compound on the base and lid wall is also described in DE 10 2013 008 045.2 or DE 10 2013 008 045 A1.

BRIEF SUMMARY OF THE INVENTION

The object of the invention is to provide a method for applying a sealing compound to the base and the inside of an annular wall of a lid for containers, in which air inclusions in the transition area of the lid base and wall are avoided.

An embodiment of the method comprises two steps, namely the application of a annular structure to the base of the lid and the molding of the sealing compound to the base and wall of the lid. In the first step, the sealing compound is pressed radially outwards only as far as the area of the transition radius with the aid of an applicator, which extends from the end face of the outer forming part (the applicator) via a gap narrowing radially outwards towards the lid base, avoiding air inclusions. In the second step, as is known per se, the sealing compound preformed in this way is pressed against both the lid base and the inner wall of the lid with the aid of a press ram.

The disclosed method combines the application of an annular structure comprised of sealing compound and a preforming step by giving the outer forming part (scraper) of the applicator a special contour on the end face. The contour of the sealing compound preformed in this way no longer has a circular or an approximate circular cross-section as in the known cases, but is flattened and has a low height radially on the outside. In cross-section, the upper side of the second annular structure has a roof shape, for example. In the invention, it is generated by the outer forming part (scraper) of the applicator. The method of applying a sealing compound to the base and the inside of an annular wall in accordance with the invention avoids air pockets in this way.

Another embodiment of the method comprises three steps for applying a sealing compound to the base and wall of the lid. In a first step, an annular structure of sealing compound is deposited on the lid base by means of an applicator. In a second step, the circular structure of plasticized sealing compound is pressed against the lid base by means of a ring-shaped first press ram which surrounds an inner forming part (or guide), the sealing compound being pressed radially outwards in the region of the transition radius between lid base and lid wall with the aid of the end face of the first press ram over a gap which narrows radially outwards towards the lid base, avoiding air inclusions. In a third step, the second annular structure produced in the second step is pressed against the lid base and into the gap between the lid wall and the second press ram with the aid of a second press ram.

While in the above described method according to the invention the preforming of the annular structure is carried out with the aid of the scraper of the applicator, in the latter described method according to the invention, an intermediate or preforming step is carried out with the aid of a first press ram, which in its end face has a contour in cross-section as already described in connection with the outer forming part (scraper) of the applicator. The effect achieved here is the same as described, namely the avoidance of air inclusions in the transition area between the lid base and wall.

According to another embodiment of the method, the sealing compound on the lid base is pressed over an annular gap between the end face and the lid base of the outer forming part or the press ram, whose cross section becomes progressively narrower moving radially outwards. It is also advantageous for the implementation of the process if there is a narrow gap between the outer forming part (scraper) or other press ram and the lid wall, which develops a sealing effect and prevents material from being squeezed upwards from the transition area between the base and the lid wall during the application of the annular structure and its formation by the scraper.

It is advantageous to apply the disclosed method to a known method, in which the annular press ram is pressed in the direction of the lid base onto the circular structure of plasticized sealing compound between an inner forming part arranged radially inwards of the press ram and an annular outer forming part arranged radially outwards of the press ram and forming an annular gap to the lid base, wherein the plasticized sealing compound is pressed into the gap and radially outwards through the annular gap onto the lid base and onto the lid wall adjoining the lid base.

An embodiment of a device for carrying out the disclosed method is also provided. In an embodiment, the device comprises an applicator, having an inner forming part which can be guided towards the lid base and has channels and an outlet gap for the sealing compound, and having an outer forming part which surrounds the inner forming part, acts in the manner of a knife and is axially movable coaxially with the inner forming part in order to separate the sealing compound emerging from the outlet gap and press it against the lid base with its end face. A pressing device with a second inner forming part, which can be guided against the lid base and is surrounded by an annular press ram, which can be moved coaxially to the second inner forming part, for pressing the sealing compound flat against the lid base and lid wall. The cross-section of the end face of the outer forming part of the applicator is shaped in such a way that the sealing compound is pressed radially outwards into the region of the transition radius between the lid base and the lid wall when the sealing compound is pressed on.

In an embodiment, the device comprises an applicator with means for applying an annular structure to the base of the lid. The device further comprises first pressing device having a first inner forming part and which can be guided against the lid base and is surrounded by an annular first press ram, which can be moved coaxially with the inner forming part, for pressing the sealing compound against the lid base, the cross section of the end face of the first pressing ram being shaped such that the sealing compound is pressed radially outwards into the region of the transition radius between the lid base and the lid wall during pressing. The device further comprises a second pressing device with a second inner forming part which can be guided against the lid base and is surrounded by an annular second pressing ram which can be moved coaxially with the second inner forming part for pressing the sealing compound flat against the lid base and lid wall.

In an embodiment of the device, the end face of the outer forming part or the first press ram is shaped in cross section, preferably concave, in such a way that the annular gap between the end face and the lid base becomes smaller radially outwards and the radial exit of the annular gap in a lower end position of the outer forming part or other press ram covers only the area of the transition radius.

According to an embodiment, the exit gap is located near the lower end of the inner forming part and has a relatively large cross-section and the outer forming part is designed in such a way that the exiting sealing compound can be peeled off. The outer forming part acts here largely like a knife to separate the extruding sealing compound and deposit it on the lid base. This process is made possible above all by the fact that a non-stick coating is applied beforehand, which facilitates the separation of the sealing compound. At the same time, the lid base is usually provided with an adhesive layer so that the sealant remains on the lid base when the applicator is removed.

In an alternate embodiment, it is provided that the outlet gap is located near the lower end of the inner forming part and has a relatively small cross-section and the outer forming part is designed to squeeze the extruded sealing compound. Here, too, an anti-adhesive coating on the associated forming parts can be advantageous.

The inner and outer forming part of the applicator can be cylindrical or ring cylindrical in shape. In an embodiment, the inner forming part has a downwardly widening conical section below the outlet gap and the outer forming part has an inclined annular surface at the lower end adapted to the conical section. The latter enables the sealing compound to be squeezed off particularly effectively.

In another embodiment, the outer forming part is surrounded by a further annular forming part which is axially movably adjacent to the lid wall when the applicator is inserted and the lower end face of the outer forming part and the further forming part together form a surface in cross-section which, when the sealing compound is pressed on, presses it radially outwards into the region of the transition radius between the lid base and the lid wall.

BRIEF DESCRIPTION OF THE DRAWINGS

The invention is explained in more detail below by means of figures.

FIG. 4 illustrates a cross-sectional view of the right half of an embodiment of a generally known applicator for applying a ring-shaped structure of sealing compound to the lid base, whereby the sealing compound remains largely in the transition area and is not squeezed into the gap between the press ram and wall.

FIG. 5 illustrates an enlarged view of the embodiment of FIG. 4.

DETAILED DESCRIPTION OF THE INVENTION

Figure 1:
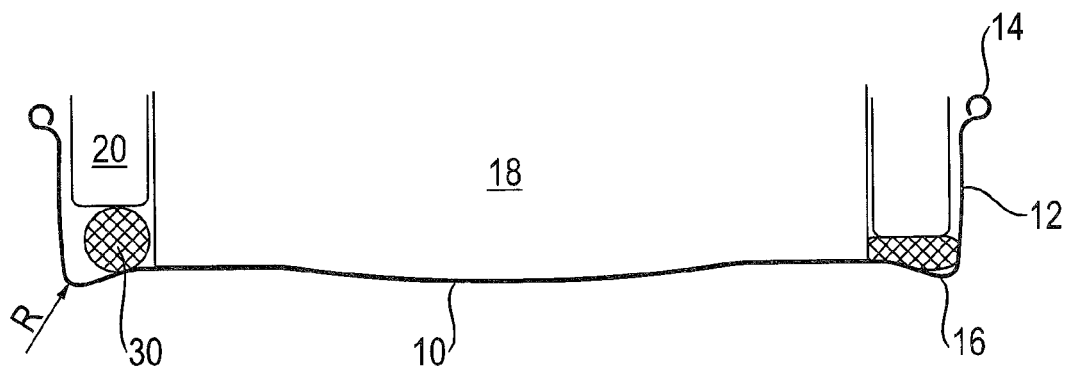
FIGS. 1-3 illustrates a schematic depiction of a stage in various process stages of pressing sealing compound on the base and wall of a container lid.
Figure 2:
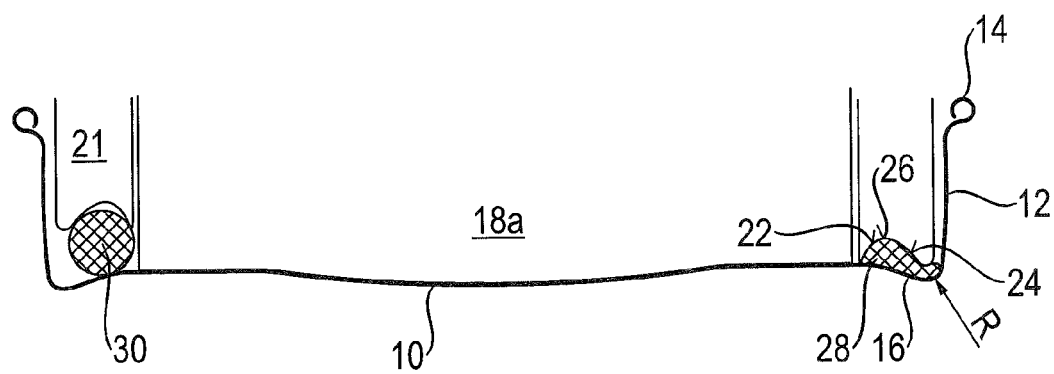
Figure 3:
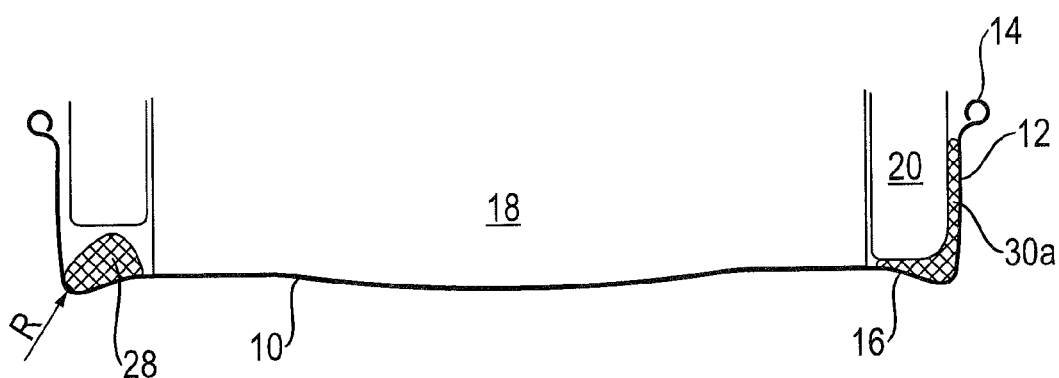

FIGS. 1-3 show a lid for a container, for example for a food container, such as a baby food container or similar. The lid has a circular lid base 10 and a circular, for example annular, lid wall 12 surrounding the lid base 10. At its end delimiting the opening of the lid, the lid wall 12 has a circular curl 14. The lid base 10 has a circular transition area 16 adjacent to the lid wall 12 and recessed in relation to the rest of the lid base 10. The lid has a small transition radius R from the recessed area 16 to the lid wall 12.

FIGS. 1-3 show an inner forming part 18 extending to the lid base 10. Between the inner forming part 18 and the lid base 10 a gap can optionally be provided. An outer press ram 20 extends in a ring around the inner forming part 18. The inner forming part 18 and the outer press ram 20 are used to create a seal coating on the edge of the lid base 10 and on the inside of the lid wall 12. FIG. 1 shows a starting situation or first stage or first step as known in the art. Before this step, a ring-shaped structure 30 made of plasticized sealing compound is applied to the edge of the lid base 10 with the aid of a suitable applicator, as described in WO 2015/181668 A1 (FIG. 1 left). The lid is heated for this purpose. Then the press ram 20 moves downwards in relation to the inner forming part 18 to press the sealing compound flat against the lid base and the lid wall 12 (FIG. 1 right hand side). In this illustration the sealant is only slightly deformed. It can be seen that further deformation would result in air being trapped in the transition area of the radius R if the sealant were to be driven out radially. These air inclusions remain if the sealing compound is pressed into the gap between lid wall 12 and forming press part 20 during further deformation.

FIG. 2 illustrates a preforming process according to the disclosed method to avoid air inclusions. To this end, an inner forming part 18a surrounds a first or preform press ram 21, which deforms the annular structure 30 of plasticized sealant in a manner as shown on the right side of FIG. 2. The end face of the press ram 21 is concave or roof-shaped or generally dome-shaped in cross-section with an inner bevel 22 and an outer bevel 24 connected by a curved or rounded surface 26. The inclined surface of the inner bevel 22 is the shorter one and the outer inclined surface of the outer 24 is the longer one, whereby the apex of the curved surface 26 is radially inwardly offset from the center of the ring of the preform press ram 21. With the end face of the press ram 21 thus formed, the annular structure 30 is transformed into a second annular structure 28, as shown on the right side of FIG. 2. A radially outward tapering annular gap is formed between the bottom of the recess 16 and the inclined surface 24 of the press ram 21. In the lower end position of the press ram 21, the radial exit of this gap is approximately aligned with the transition radius R. It can be seen that with the aid of such a pre-forming of the sealing compound, the critical area of the lid is filled with sealing compound without air inclusion, whereby the sealing compound remains largely in this transition area and is not squeezed into the gap between the press ram and wall 12. This annular gap between the press ram 21 and the lid wall is relatively small to ensure a sealing effect.

FIG. 3 illustrates the finished shape of the seal. In FIG. 3, on the left, the second press ram 20 is located above the preformed second annular structure 28, which fills the critical transition radius. In FIG. 3 on the right, the press ram 20 has formed the annular structure 28 into a seal 30a, which fills both the recessed area 16 and the gap between the press ram 20 and the lid wall 12. In this way, a seal is created at the lid base 10 and lid wall 12, which is without air pockets.

FIGS. 4 and 5 show a cross-section of the right half of a generally known applicator for applying a ring-shaped structure to the lid base, whereby, according to the invention, the sealing compound remains largely in this transition area and is not squeezed into the gap between the press ram and wall 12. It is shown how an inner forming part 40 of the applicator is held against the base 10 of the lid already described above (shown here without curling). In the case shown, a gap is provided between the lower surface of the forming part 40 and the base 10 of the lid. The inner forming part 40 has a series of channels 2 (only one is shown in FIG. 4), to which plasticized sealant is fed, which is guided downwards from the upper end of the forming part 40 until it is close to the lower end of the forming part 40. At the lower end, the channels 2 are bent radially outwards towards an annular gap opening 42. Through this annular gap, plasticized sealing compound can escape to the outside in an area above the base 10.

The inner forming part 40 is surrounded by an annular outer forming part 44 (scraper), which is movable coaxially with the inner forming part 40 as indicated by arrow 46 and separates the sealing compound emerging from the outlet gap. The special feature of the outer forming part 44 is that its lower end face has a contour, as explained in connection with FIG. 2 on the right-hand side of the extrusion ram 21. Therefore the reference marks in FIGS. 4 and 5, as far as they concern this contour, are the same as in FIG. 2 on the right. The inner bevel 22 of the sloping or roof-shaped, or dome-shaped surface forms a more or less sharp edge 34 with the inner surface of the forming part 44. This knife-like edge 34 cuts off the sealant emerging from the annular gap 42 when the forming part 44 moves towards the lid base 10. On the lid base, the sealant is shaped to form the ring-shaped structure 28 as shown in FIG. 2 on the right, with the result that the sealant is pressed into the transition area with the radius R as soon as it is applied to the lid base 10 and thus completely fills this area without any air pockets. Further reshaping for coating the lid wall 12 can then take place, as explained in connection with FIG. 3 right.

The exit gap of the sealing compound from the inner forming part is preferably located near the lower end of the inner forming part and can have a relatively large or also a relatively small cross-section. In the former case, the sealing compound is essentially peeled off, whereas in the latter case it is essentially squeezed off. The design of the cross-section of the exit gap and the separating contour of the outer forming part must be determined by tests, if necessary, depending on the properties of the sealing compound, whereby the use of non-stick coatings is of great advantage.

Figure 6:
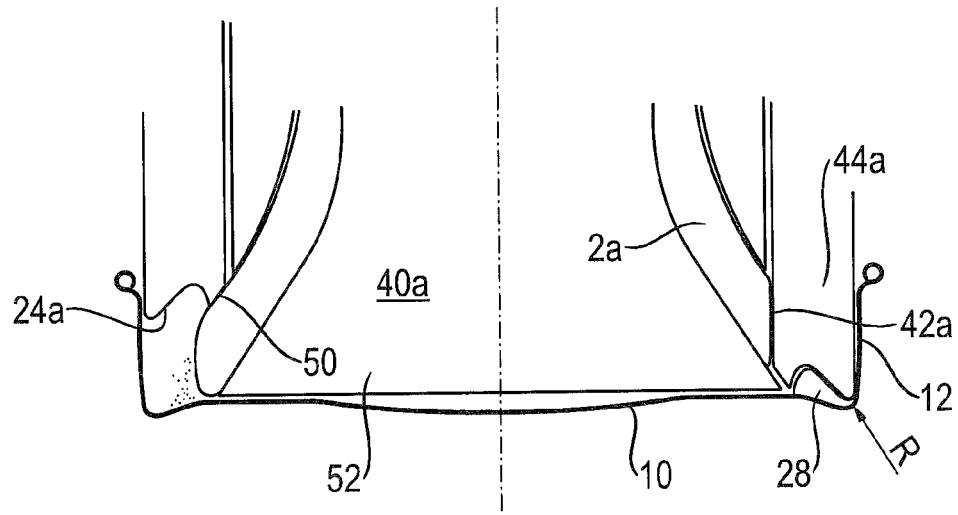
FIG. 6 illustrates a cross-sectional view of an embodiment of an applicator for applying a ring-shaped structure of sealing compound as disclosed.
Figure 7:
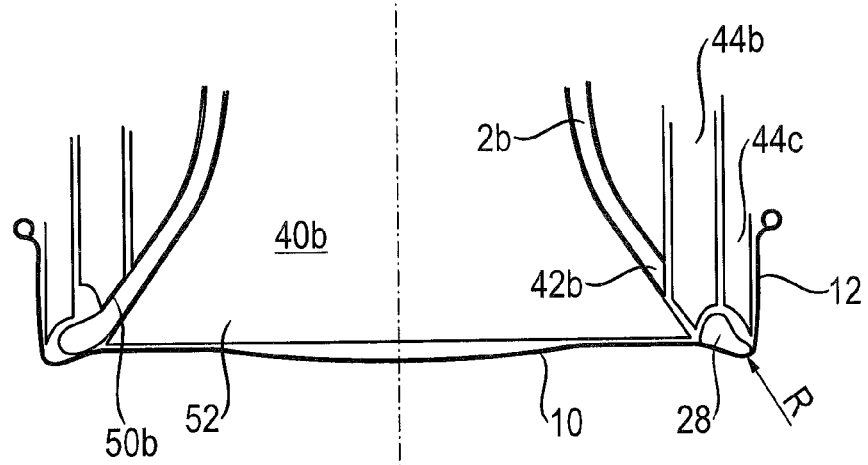
FIG. 7 illustrates a cross-sectional view of another embodiment of an applicator for applying a ring-shaped structure of sealing compound as disclosed.

It can be seen that the last method described combines the process steps of application and preforming of the sealant. This is done by giving the scraper (forming part 44) of the applicator the contour of the pre-forming press ram 21 as shown in FIG. 2.

Where similar or identical parts are used in FIG. 6 as in FIGS. 4 and 5, the same reference signs are used followed with an 'a'. The lid corresponds to that shown in FIGS. 1 to 3. The outlet gap 2a has a relatively large cross-section and is relatively close to the lower end of the inner forming part 40a. The outer forming part 44a does not have a knife-like edge as in the case of the design according to FIGS. 4 and 5, but a short annular bevelled surface 50 adjoining the concave end contour 24 radially inwards, with which the escaping sealing compound is essentially peeled off. This process takes place between the position of the forming parts on the left side of FIG. 6 and the forming parts on the right side of FIG. 6. The inner forming part also has a downwardly conically widening section 52 below the outlet gap 2a, with the annular bevel 50 adapted to the outer contour of the conical section 52, as shown on the right-hand side of FIG. 6. In the final position of the outer forming part 44a, the surface 50 therefore lies against the outside of the conical section 52.

Where identical parts are used in FIG. 7 as shown in FIGS. 4 and 5, identical reference marks are used followed by a 'b' is added where appropriate. The exit gap 42b has a relatively small cross-section. Below the exit gap 42b, the forming part 40b is again provided with a conical section 52. The outer forming part 44b, which surrounds the inner forming part 40b, extends radially only at a distance from the lid wall 12. Between the outer forming part 44b and the lid wall 12 is another forming part 44c, which can be moved axially in the same direction as the outer forming part 44b. The outer forming part 44b acts like the scraper or the outer forming part 44a as shown in FIG. 6. Both outer forming parts 44b and 44c together with their end faces form the cross-sectionally concave contour 28 as shown in FIGS. 4 and 5. With the annular sloping surface of the outer forming part 44b, the material is essentially squeezed out of the relatively small outlet gap 42b. The decisive factor, however, is the deformation of the sealing compound in such a way that it is deformed with the two outer forming parts 44b and 44c in the lid base in such a way that the area of the transition radius R is filled without air inclusions.

The invention claimed is:

1. A method for applying a sealing compound to a lid base and an inside of an annular wall of a lid for containers, wherein the lid defines a transition area between the lid base and the annular wall of the lid and includes a transition radius, the method comprising:
   depositing an annular structure of sealing compound on the lid base, wherein the annular structure of sealing compound is deposited using an applicator, wherein the sealing compound is dispensed via channels and an outlet gap of an inner forming part, wherein the inner forming part is configured to move against the lid base;
   cutting off a supply of sealing compound at the outlet gap by an outer forming part surrounding the inner forming part and configured to move relative to the inner forming part;
   pressing the sealing compound with an end face of the outer forming part against the lid base to form an annular structure of sealing compound, wherein the sealing compound is pressed radially outwards into the transition radius; and
   pressing the annular structure of sealing compound flat against the lid base and against the lid wall adjoining the lid base using an annular press ram configured to surround a second inner forming part of a pressing device.

2. The method according to claim 1, wherein a gap is formed between the end face of the outer forming part and the lid base, wherein the gap narrows radially outwards towards the lid base.

3. A method for applying a sealing compound to a lid base and an inside of an annular wall of a lid for containers, wherein the lid defines a transition area between the lid base and the annular wall of the lid and includes a transition radius, the method comprising:
   applying a first annular structure to the lid base with an applicator, the first annular structure comprising the sealing compound;
   pressing the first annular structure of sealing compound against the lid base to form a second annular structure, wherein the pressing is performed using an annular first press ram surrounding an inner forming part;
   pressing the second annular structure of sealing compound radially outwards into the transition radius with an end face of the first press ram, wherein the sealing compound is pressed through a gap defined between the end face of the first press ram and the lid base, and wherein the gap narrows radially outwards towards the lid base to avoid air inclusions; and
   pressing the second annular structure flat against the lid base and into the gap between the lid wall and the first press ram using a second press ram.

4. The method according to claim 1, wherein a narrow gap is maintained between one of the outer forming part and first press ram, and the lid wall.

5. The method according to claim 4, wherein the annular press ram is positioned between an inner forming part arranged radially inwards of the press ram and an annular outer forming part arranged radially outwards of the press ram, wherein an annular gap between the annular press ram and the lid base is formed, and wherein the sealing compound is pressed into the annular gap and radially outwards through the annular gap onto the lid base and onto the lid wall adjoining the lid base.

6. A device for applying a sealing compound to a lid base and an inside of an annular wall of a lid for a container, wherein the lid defines a transition area between the lid base and the annular wall of the lid and includes a transition radius, the device comprising:
   an applicator comprising,
      a first inner forming part and configured to be guided towards the lid base,
      a series of channels and an outlet opening configured to dispense the sealing compound, and
      an outer forming part surrounding the first inner forming part and configured to move coaxially relative to the first inner forming part to cut off a flow of the sealing compound dispensed from the outlet opening, the outer forming part comprising an end face configured to press the sealing compound against the lid base and radially outwards into the transition area; and
   a pressing device including a second inner forming part configured to be guided against the lid base, wherein the second inner forming part is surrounded by an annular press ram configured to move coaxially relative to the second inner forming part and press the sealing compound flat against the lid base and lid wall,
   wherein the end face of the outer forming part comprises a cross-section that comprises a shape including a radially inner inclined surface and a radially outer inclined surface,
   wherein a rounded transition surface is positioned between the radially inner inclined surface and the radially outer inclined surface, and wherein the sealing compound is pressed radially outward into a region of the transition radius between the lid base and the lid wall.

7. A device for applying a sealing compound to a base and an inside of an annular wall of a lid for a container, wherein the lid defines a transition area between the lid base and the lid wall and includes a transition radius, the device comprising:
   an applicator configured to apply an annular structure comprised of sealing compound to the lid base;
   a first pressing device comprising,
      a first inner forming part configured to be guided against the lid base, and
      an annular first press ram comprising an end face and configured to surround the first inner forming part, wherein the annular first ram configured to move coaxially relative to the inner forming part to press the annular structure of sealing compound against the lid base, and wherein the end face of the first press ram is configured to press the sealing compound radially outwards into the transition radius; and
   a second pressing device comprising,
      a second inner forming part configured to be guided against the lid base, and
      an annular second pressing ram surrounding the second inner forming part and configured to move coaxially relative to the second inner forming part and further configured to press the sealing compound flat against the lid base and lid wall,
   wherein the end face of the first pressing ram comprises a cross-section that comprises a radially inner inclined surface, a radially outer inclined surface and a rounded transition surface positioned between the radially inner inclined surface and the radially outer inclined surface,
   wherein the sealing compound is pressed radially outward into a region of the transition radius between the lid base and the lid wall.

8. The device according to claim 6, wherein the end face of the outer forming part comprises a concave surface and is configured such that an annular gap is defined between the end face and the lid base, and wherein the annular gap includes a radial exit in a lower end position of the outer forming part.

9. The device according to claim 8, wherein the annular gap decreases in diameter in a direction towards the lid wall and the radial exit covers a region of the transition radius.

10. The device according to claim 6, wherein the end face comprises at least two inclined surfaces and a rounded transition surface positioned between the at least two inclined surfaces.

11. The device according to claim 10, wherein the rounded transition surface is positioned offset from a center of the end face of the outer forming part.

12. The device according to claim 11, wherein the outer forming part further comprises an inner bevel and defines a knife-like edge between the inner bevel and an inner side of the outer forming part.

13. The device according to claim 6, wherein the outlet opening is located near a lower end of the inner forming part, and wherein the outer forming part is configured to cut off a flow of sealing compound from the outlet opening.

14. The device according to claim 6, wherein the outer forming part is configured to squeeze the sealing compound emerging from the outlet opening.

15. The device according to claim 13, wherein the inner forming part comprises a widening conical section facing toward the lid and positioned below the outlet opening, and wherein the outer forming part comprises an inclined annular surface complimentary to the conical section.

16. The device according to claim 6, wherein the outer forming part is surrounded by a second outer annular forming part comprising an end face and positioned adjacent to the lid wall and configured to move coaxially with the outer forming part.

17. The device of claim 16, wherein the end face of the outer forming part and the end face of the second outer annular forming part are configured to cooperate to press the sealing compound against the lid base and radially outwards into the transition area.

\* \* \* \* \*